May 29, 1923.
M. I. PUPIN
WAVE CONDUCTOR
Original Filed Oct. 10, 1918 3 Sheets—Sheet 1
1,456,909
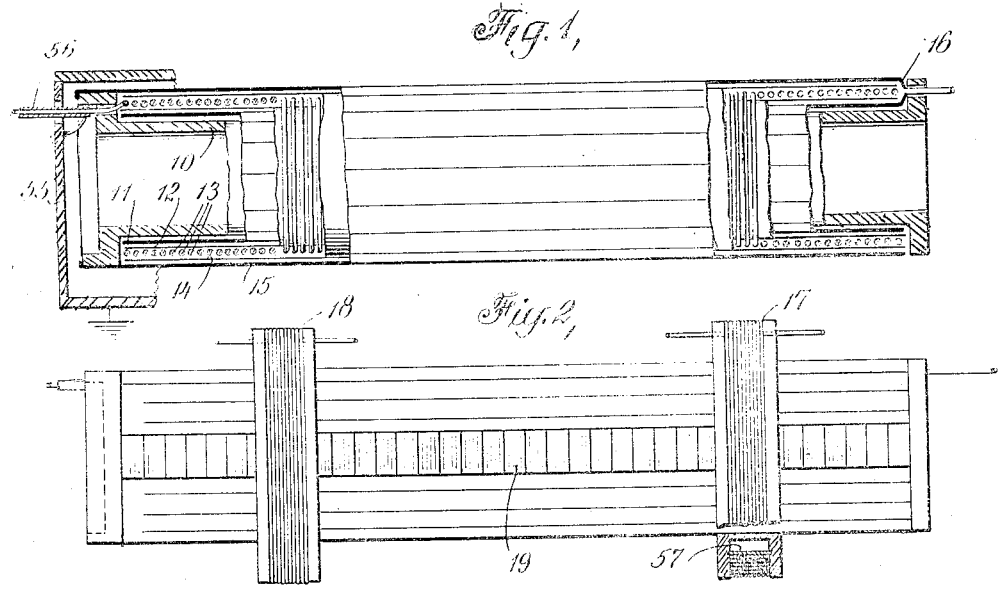
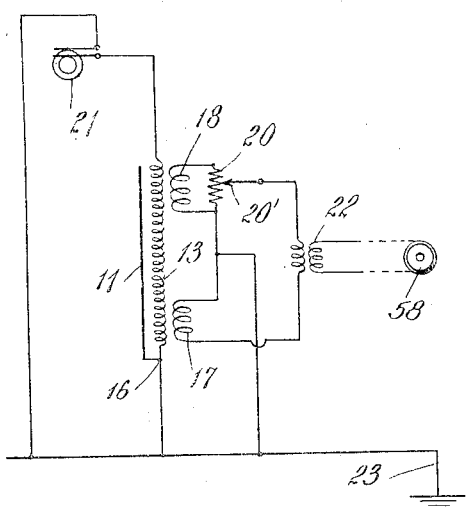
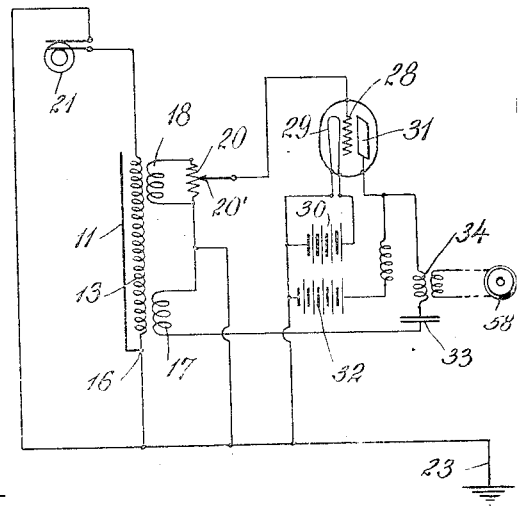
Inventor
Michael I. Pupin,
By his Attorneys
Pennie, Davis, Marvin & Edmonds

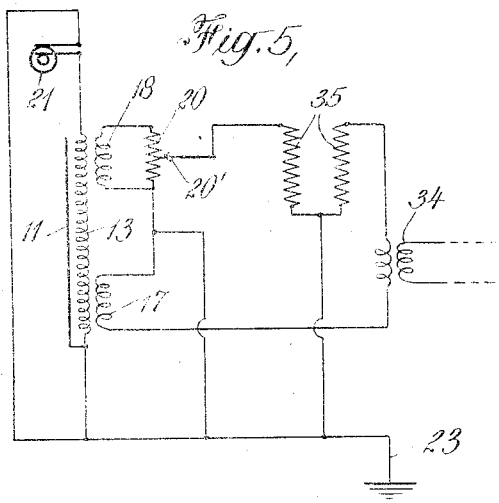
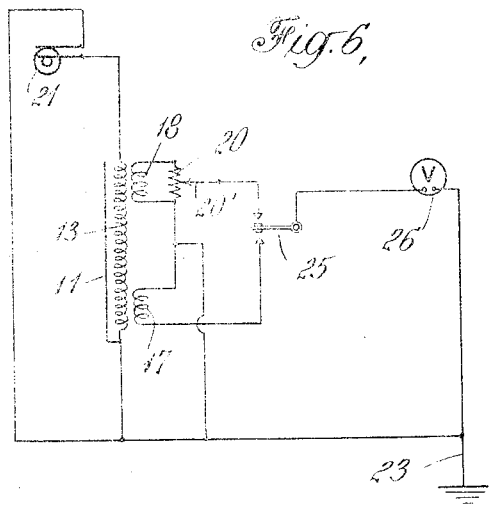
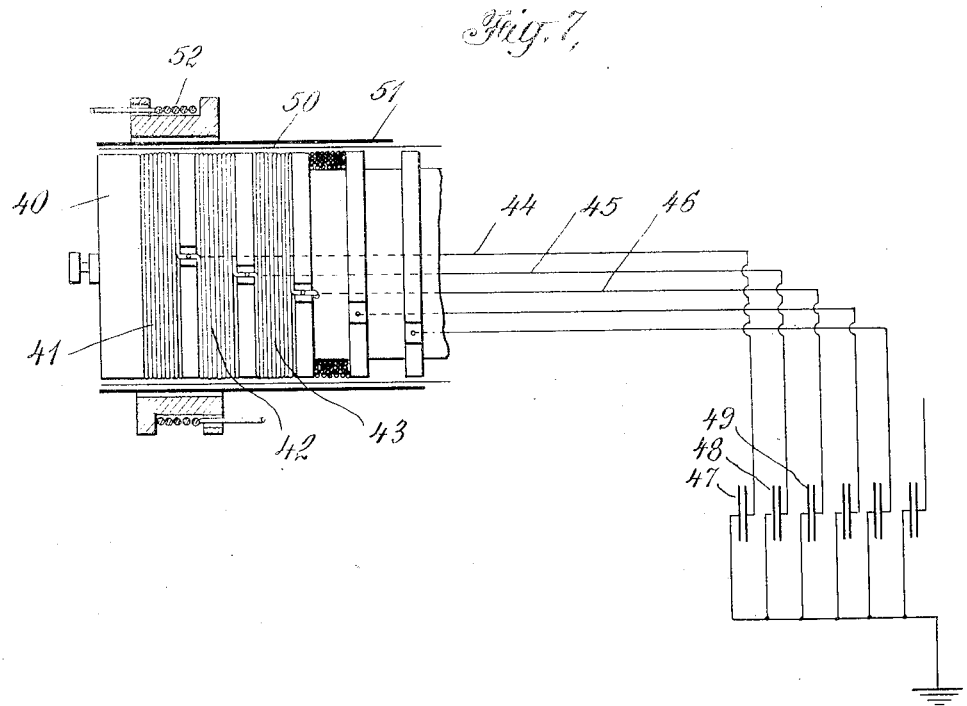

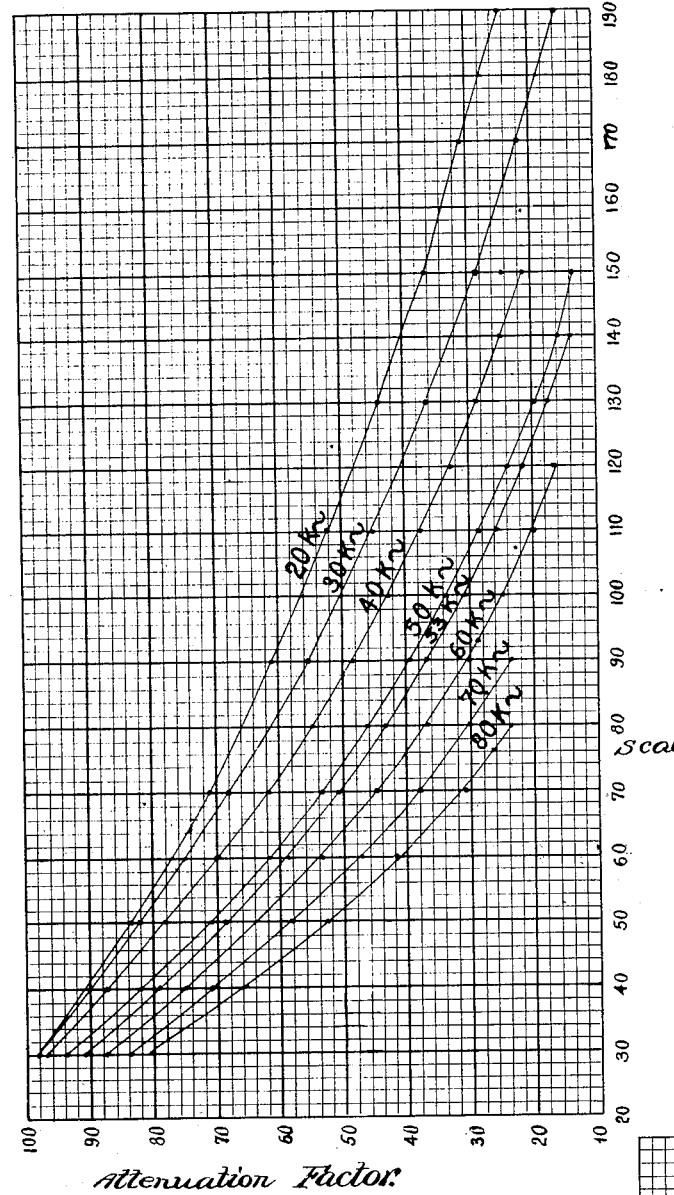
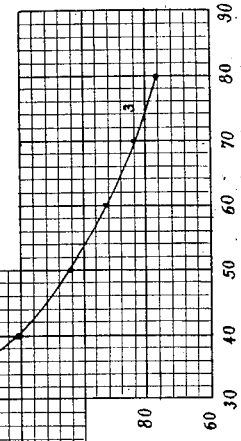
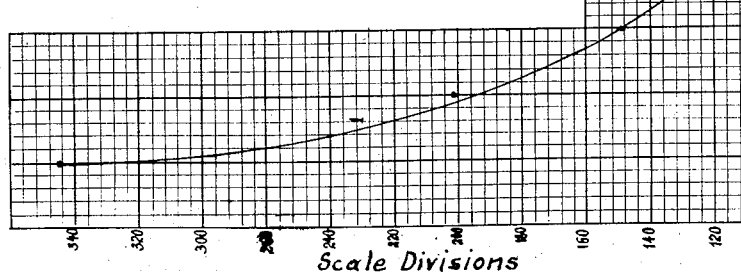
Fig. 9.
Fig. 8.

Patented May 29, 1923.

1,456,909

UNITED STATES PATENT OFFICE.

MICHAEL IDVORSKY PUPIN, OF NORFOLK, CONNECTICUT, ASSIGNOR TO WESTINGHOUSE ELECTRIC AND MANUFACTURING COMPANY, OF EAST PITTSBURGH, PENNSYLVANIA, A CORPORATION OF PENNSYLVANIA.

WAVE CONDUCTOR.

Application filed October 10, 1918, Serial No. 257,570. Renewed September 1, 1922. Serial No. 585,834.

*To all whom it may concern:*

Be it known that I, MICHAEL I. PUPIN, a citizen of the United States, residing at Norfolk, in the county of Litchfield, State of Connecticut, have invented certain new and useful Improvements in Wave Conductors; and I do hereby declare the following to be a full, clear, and exact description of the invention, such as will enable others skilled in the art to which it appertains to make and use the same.

This invention relates to apparatus for balancing in phase and amplitude pulsating or alternating electromotive force waves, and has for its object the provision of an apparatus of this character. For the sake of simplicity, I will, throughout this specification, designate the apparatus as a wave balance.

The balancing in phase and amplitude of a pulsating or alternating electromotive force wave, and in particular of high frequency waves, has many practical applications, certain of which will be hereinafter described in connection with the wave balance of the present invention. In its broad aspect, the wave balance of the present invention comprises a wave conductor having substantially uniformly distributed inductance, capacity and resistance associated with secondary circuits so arranged that the electromotive forces induced therein, by an alternating or pulsating electromotive force impressed on the conductor, can be relatively varied in amplitude and time phase. The balancing in amplitude and phase may take place directly between the electromotive forces induced in the secondary circuits, or may take place between the electromotive force induced in one of these circuits and an electromotive force modified or influenced by the electromotive force induced in the other circuit. Thus, the invention contemplates the provision of a wave balance having a wave conductor by means of which induced electromotive forces of predetermined amplitude and phase are produced from a given impressed alternating electromotive force, together with means for the utilization of these induced electromotive forces for the purpose of modifying the electromagnetic reactions in electrical circuits, which are subject to the action of the impressed electromotive force.

The accompanying drawings, which form a part of this specification, represent, diagrammatically, the essential features of this invention and some of its practical applications.

In the drawings, Figure 1 represents, diagrammatically, the component parts of a wave conductor suitable for high frequency electromotive forces; Fig. 2 represents, diagrammatically, the wave conductor of Fig. 1 embodied in a wave balance of the present invention; Fig. 3 represents, diagrammatically, the employment of the wave balance for determining the wave length produced in the wave conductor by an impressed simple harmonic electromotive force of given frequency; Figs. 4 and 5 represent, diagrammatically, the employment of the wave balance of Fig. 2 for determining the amplifying power of a vacuum tube amplifier, and the ratio of transformation of a transformer, respectively; Fig. 6 represents, diagrammatically, the arrangement for determining experimentally the attenuation curve of a wave conductor for a simple harmonic electromotive force of given frequency; Fig. 7 represents, diagrammatically, a wave balance having a modified form of wave conductor particularly adapted for low frequency electromotive forces; Fig. 8 represents a curve expressing the relation between the frequency of the impressed electromotive force and the wave length on a wave balance; and Fig. 9 represents curves which express the relation between attenuation and position of the secondary coil on the wave balance.

Referring now to Figs. 1 and 2 of the drawings, there is diagrammatically shown a hollow cylindrical core or support 10 of insulating material, surrounded by a layer of metallic conducting material 11, such, for example, as tin-foil. A layer 12 of a suitable dielectric, such, for example, as paraffined paper, surrounds the conducting layer 11. An electric current conductor 13 is wound around the dielectric layer 12 and has its two terminals extending respectively through apertures in the end flanges of the insulating support 10. The conductor 13 is surrounded by a layer 14 of dielectric material, and the latter is then covered with a layer 15 of metallic conducting material, such as tin-foil, which serves as an electrical screen for external conductors in the vicinity of the wave conductor 13, that is to say, the tin-foil layer 15 destroys the electrostatic coupling between the wave conductor and outside conductors.

The tin-foil layers 11 and 15 should be laminated by suitable cuts parallel to the axis of the core 10, as indicated by the thin lines running parallel to the axis of the cylindrical core. The two layers of tin-foil and one terminal of the coiled conductor 13 are connected together at 16, and when the apparatus is in operation, the point 16 is usually grounded. This grounded terminal will be referred to as the "end" and the other terminal will be called the "beginning" of the wave conductor. The coiled conductor 13 has, substantially, a uniformly distributed inductance, resistance and capacity and will, therefore, react against the action of a variable electromotive force approximately like an ordinary wave conductor of the form of a long telephone wire.

For the purposes of illustration, I will describe a specific construction of a wave conductor which I have successfully operated, but it will, of course, be understood that I do not intend to limit the invention to the particular dimensions mentioned in this example. In the construction referred to, the core 10 is a bakelite tube of approximately 25 cm. length and 2.5 cm. external diameter. A layer of tin-foil is wrapped about the core, and upon the tin-foil are wrapped two layers of paraffined paper forming a dielectric of about $7 \times 10^{-3}$ cm. thickness. One layer of number 36 calido wire of high resistance, having about 0.8 ohm resistance per cm., is wound upon the paraffined paper. The wire coil is then covered with another layer of paraffined paper like the first, and over this paper is laid another layer of tin-foil. The wave conductor so constructed gives a wave length of about 40 cm. and a total attenuation factor of approximately $e^{-3}$ for a frequency of 50,000 p. p. s., and a terminal impedance of approximately 2,200 ohms for the same frequency. The wave conductor has such a strong attenuation that a wave of frequency from 10,000 to 200,000 p. p. s. reflected at the "end" will not appreciably affect the phase distribution along the first half of the conductor. Hence the distribution along the first half will be just as in the case of an infinitely long wave conductor. This characteristic will be expressed by calling this wave conductor a "true" wave conductor.

The following approximate formulæ will prove useful in the design of the wave conductor:

Let
L = total inductance of the coil in henrys.
C = total capacity between the coil and the tin-foil layers in farads.
R = total resistance of the coil in ohms.
$p = 2\pi f$, $f$ being the frequency of the impressed E. M. F.
$l$ = length of the coil.
I = terminal impedance in ohms.
$\lambda$ = wave lengths in terms of $l$ as unit.
$b$ = total attenuation constant, so that $e^{-b}$ equals total attenuation factor over the length of the coil.

$$b = \sqrt{\frac{1}{2}pC[\sqrt{p^2L^2+R^2}-pL]}$$

$$\lambda = \frac{2\pi}{\sqrt{\frac{1}{2}pC[\sqrt{p^2L^2+R^2}+pL]}}$$

$$I = \sqrt[4]{\left(\frac{L}{C}\right)^2 + \left(\frac{R}{pC}\right)^2}$$

I is determined by the use of the Wheatstone bridge, and $b$ and $\lambda$ are determined in a manner which will be given further below.

In order that the wave conductor exhibit a continuously varying change in time phase difference of potential and of current, such as an infinitely long wave conductor exhibits, it must for all frequencies for which it is to be employed have approximately the following condition fulfilled:

$$2pL \leq R$$

That is, it must possess so high an attenuation for its length that the reflected wave is too feeble to form with the incoming wave an appreciably stationary wave. It will also be an approximately aperiodic, or, at any rate, a very highly damped wave conductor. The fulfillment of these conditions is desirable for the successful employment of the wave balance in the manner proposed by this invention.

The wave length, the attenuation constant, and the terminal impedance of the wave conductor, hereinbefore described, can thus be calculated, as indicated by the foregoing formulæ, from the inductance, resistance, capacity and frequency of the impressed electromotive force, and these constants, again, can be calculated from the dimensions of the apparatus and from the electromagnetic properties of the materials employed in its construction. These calculations will give results which are rough aproximations, but when the apparatus is finished, the wave constants can be determined accurately by a Wheatstone bridge and by other experimental methods certain of which will be described hereinafter.

Referring now to Fig. 2, two secondary circuits 17 and 18, are there represented inductively associated with the wave conductor 13. Each secondary circuit comprises a cylindrical spool surrounding the conductor 13 and arranged to be longitudinally moved with respect thereto. Equal secondary coils are wound on the relatively movable spools, the number of turns of these secondary coils being determined by the character of the practical application for which the wave conductor is to be employed. A scale 19 is fixed to the outer tin-foil layer 15 for determining the relative positions of the secondary coils with respect to the wave conductor.

In applications of the wave balance in which the capacity between the wave conductor and the secondary coils should be reduced as much as possible, as, for example, when employing the wave balance as a negative resistance compensator in a selective amplifying apparatus, as described in my copending application Ser. No. 257,572, filed October 10, 1918, the distance between the outer tin-foil layer 15 and the secondary coils should be as large as practicable. Fig. 2 of the drawings shows certain details of construction of the secondary circuits of a wave balance which I have successfully operated. In this case, each secondary coil has about five hundred turns of No. 39 copper wire wound in six layers which are separated by several thicknesses of paraffine paper in order to reduce their mutual capacity. The innermost layer of the secondary coil is wound on a cardboard support or partition 57 separated from the adjacent outer cylindrical surface of the spool by as wide an air space as is practicable.

It is obvious that the electromotive force induced in the secondary coil 17 is different, both in phase and in amplitude, from that induced in the secondary coil 18. When the coil 17 is positioned at a distance of just one-half wave length from the coil 18, then the phase in the former differs from that in the latter by 180 electrical degrees. The ratio of the amplitudes of the electromotive forces induced in the two secondary coils depends upon the attenuation constant of the wave conductor.

Referring to Fig. 3, it will now be shown how the wave length of the wave conductor 13 may be experimentally determined. In this figure, the inner layer of tin-foil, the wave conductor and the secondary coils are symbolically represented by the same reference numerals as in Fig. 1. The terminals of the coil 18 are connected by a suitable resistance 20. This resistance should be large in comparison with the impedance of the secondary coil. The resistance 20 has an adjustable contact or terminal 20′, and functions, in effect, as a non-inductive potentiometer having large resistance in comparison with the impedance of the secondary coil 17. An alternator, or vacuum tube oscillator, 21 impresses upon the wave conductor 13 an alternating electromotive force of a frequency for which the wave length is to be determined. The secondary coil 17, together with an adjustable portion of the resistance 20, are included in a series circuit with the primary winding of a transformer 22. A heterodyne receiver connected to the secondary winding of the transformer 22 will detect the presence of a current in this series circuit. The secondary coils 17 and 18 are connected to ground by a common conductor 23. One terminal of the source of alternating electromotive force 21 and the point of connection 16 between the wave conductor 13 and the tin-foil layers 11 and 15 are also connected to ground through the common conductor 23.

The series circuit including the secondary coil 17, the primary winding of the transformer 22 and a portion of the resistance 20 will have a resultant zero electromotive force when the coil 17 is positioned at a distance of one-half wave length (with respect to the frequency of the electromotive force impressed on the conductor 13) from the coil 18 and the adjustable contact of the resistance 20 throws into the circuit a resistance drop equal in amplitude to the electromotive force induced in coil 17. The balance is indicated by the silence of the telephone 58 in the heterodyne receiver. The distance apart of the secondary coils 17 and 18, when this balance is effected, is equivalent to one-half the wave length to be determined.

Referring now to the curve of Fig. 8, the abscissæ represent the frequency of the impressed electromotive force in kilo cycles, and the ordinates represent the half wave length corresponding to these frequencies expressed in scale divisions of the scale attached to the wave balance. The curve was obtained experimentally by the method just described.

The attenuation curve of the wave conductor 13 for any given frequency may be determined by the arrangement of apparatus represented in Fig. 6. In this figure, the wave conductor 13 is connected to the source of alternating electromotive force 21 as in the arrangement of Fig. 3. A double throw switch 25 is attached to connect either the ungrounded terminal of the secondary coil 17 or any point of the resistance 20 to a grounded galvanometer 26. A Duddell hot wire galvanometer is convenient for this purpose. When the adjustable contact of the resistance 20 reaches a certain point so that the galvanometer 26 gives the same deflection for both operative positions of the switch 25, the drop of potential across the adjusted portion of the resistance 20, which is impressed upon the galvanometer 26, is equal to the electromotive force induced in the secondary coil 17. In this manner, the ratio of the amplitudes of the electromotive forces induced in the secondary coils 17 and 18 are determined, and this ratio determines the attenuation factor for any distance between the two coils. Having determined this ratio for a sufficiently large number of positions of the coil 17, while retaining the coil 18 at a fixed position near the beginning of the wave conductor, the attenuation curve for the frequency under consideration can be plotted and forms part of the calibration of the wave balance.

Referring to the group of curves in Fig. 9, which were determined experimentally by the method just described, consider any one of them, say the one marked 50 K ⊙ (K ⊙ meaning kilo-cycles). The abscissa of any point on that curve represents the scale division on the scale of the wave balance and the corresponding ordinate represents the ratio of the electromotive force induced in the secondary when it is at that scale division divided by the electromotive force induced in it when it is at the beginning of the wave balance, this ratio being multiplied by 100. This curve is then the attenuation curve of the wave balance for a frequency of 50,000 p. p. s., (50 K ⊙). Fig. 9 represents the attenuation curves of the wave balance for a plurality of different frequencies ranging from 20 K ⊙ to 80 K ⊙.

In Fig. 4, I have represented an arrangement of apparatus for employing the wave balance to determine the amplifying power of a vacuum tube amplifier. The wave balance and associated parts are represented by the same reference numerals as in the preceding figures. The grid 28 of the vacuum tube amplifier is electrically connected to the adjustable contact or terminal of the resistance 20. The hot filament 29 is connected to a low voltage source of direct current energy 30, while the wing or electron circuit, including the filament 29 and plate 31, is connected across a source of direct current potential 32, in the usual manner. The ungrounded terminal of the secondary coil 17 is connected to the plate 31 through a condenser 33 and the primary winding of a transformer 34. The secondary winding of the transformer 34 is connected to a heterodyne receiver. The condenser 33 prevents the potential of the plate 31 establishing a D. C. current to ground. By means of the adjustable contact of the resistance 20 a suitable fraction of the voltage induced in the secondary coil 18 is impressed upon the grid 28, and is reproduced in amplified form at the plate 31, and will there produce an alternating current through the primary winding of the transformer 34, condenser 33, secondary coil 17 to ground and back to the plate 31. When, however, the electromotive force induced in the secondary coil 17 is of opposite phase and of equal amplitude, no current will flow in the circuit just mentioned, and the heterodyne detector will be silent. This silence is, however, produced by adjusting the amplitude of the electromotive force impressed upon the grid 28 and by moving the secondary coil 17 until the phase relation is properly adjusted so as to produce silence in the detecting telephone. The amplifying power of the vacuum tube amplifier may then be calculated from the potential impressed upon the grid and from the position of the secondary coil 17 by means of the attenuation curve for the frequency under consideration. It is obvious that the position of the secondary coil 17 also determines the phase relation between the electromotive force impressed upon the grid 28 and its amplified reproduction on the plate 31.

In Fig. 5 of the drawings, a transformer 35 has been substituted for the vacuum tube amplifier and its associated parts represented in Fig. 4. By impressing a potential difference upon the ungrounded end of the primary of this transformer, such as was impressed upon the grid 28, and by connecting the ungrounded end of the secondary of the transformer in the same manner as the plate 31 was connected in Fig. 4, we can obtain, by means of the wave balance and in the manner just described, the ratio of transformation and the phase shifting of the secondary electromotive force of the transformer, which determinations are of great value in operations with very high frequency electromotive forces.

It is obvious that in its operations, so far described, the true wave conductor constitutes a wave balance. It is also clear that in all these operations with high frequency electromotive forces, the greatest care must be taken that extraneous disturbances be avoided by electromagnetic screening.

All this is indicated in the diagrams of Fig. 1, where, in addition to the screening provided by the tin-foil layers, there is also indicated the screening provided for the terminal in the beginning of the wave conductor and also the screening provided by the metal box in which the wave balance is placed. Thus, it will be noted that at the ungrounded terminal of the conductor 13 the outer tin-foil layer 15 extends over the shoulder of the insulating support 10 and shields the portion of the conductor projecting through this shoulder. The wave balance is enclosed in a box 55 of conducting material, preferably magnetic, to provide electrostatic and electromagnetic screening. The box may advantageously be constructed of sheet steel. The ungrounded terminal of the conductor 13 projecting through the box is further shielded by a covering of conducting material, such as a braided or flexible wire 56, insulated from the conductor, and preferably grounded by connection to the box 55, which is itself connected to ground.

When a wave conductor is to be employed for low frequencies in the manner hereinbefore described, a modified form of construction can be adapted which is diagrammatically represented in Fig. 7. Referring to this figure, the spool or support 40 may be of seasoned wood, hard rubber of bakelite, and is provided with suitable recesses as indicated. In these recesses are wound equal coils 41, 42, 43 . . . of high resistance wire, each coil having several layers to give it a sufficiently high inductance. These coils are connected in series. The junction of adjacent coils are connected by conductors 44, 45, 46 . . . to grounded condensers 47, 48, 49 . . . The conductors pass through the interior of the insulating support 40 and should preferably be metallic covered to screen them from each other. The condensers 47, 48, 49 . . . are of equal capacity and each is grounded as indicated.

The wave conductor thus obtained is a sectional wave conductor. Twenty sections will suffice to make it available for an interval of frequencies in which the lowest frequency is about one-tenth part of the highest frequency. For the lowest frequency, the whole length of the wave conductors should develop a little over one-half of the wave length and for the highest frequency there will be a little more than three halves of the wave length as indicated by the mathematical formulæ hereinbefore given. There will be for even the highest frequency considerably more than ten sections per wave length and the wave conductor will behave even for the highest frequency just like a uniform wave conductor. The wave conductor is covered with paraffined paper 50 over which is wrapped a heavy laminated layer 51 of tin-foil to screen the coils of the wave conductor from external electrical fields. The "end" of the wave conductor is connected to the tin-foil layer 51 and then grounded. Relatively movable secondary coils 52 are wound, as indicated, upon insulating spools surrounding the wave conductor. The same principles apply here as in the case of the wave conductor illustrated in Fig. 1 for making it approximately aperiodic and equivalent to a wave conductor of infinite length.

I am aware that a wave conductor of small attenuation can also act like an infinitely long wave conductor when its end is connected to an impedance which is equal to the initial impedance of the wave conductor, its length being supposed to be infinitely long; because, in that case, there is no reflection of the electrical wave at the end. But this condition can be fulfilled for one frequency only and would have to be adjusted with each change of frequency. I prefer, therefore, to employ highly attenuating wave conductors as true wave conductors because they do not need any adjustments with change of frequency and also because they are practically aperiodic. But in all practical applications described above and to be described in other patent applications of even date, I claim this other type of wave conductor as an equivalent.

I claim:

1. A wave balance, comprising a conductor having substantially uniformly distributed inductance, resistance and capacity, and secondary circuits inductively related to said conductor and relatively movable with respect to each other and to the conductor.

2. A wave balance, comprising a conductor having substantially uniformly distributed inductance, resistance and capacity, and a pair of secondary circuits inductively associated with said conductor and arranged to be positioned with respect thereto so that the electromotive forces induced in said circuits are of predetermined amplitude and phase relation with respect to each other and with respect to the electromotive force impressed upon the conductor.

3. A wave balance, comprising an insulating support, a layer of conducting material surrounding said support, a conducting wire wound on said layer of conducting material and separated from it by a dielectic, a second layer of conducting material surrounding said wire and separated therefrom by a dielectric, the two conducting layers being conductively connected to one terminal of the wire, and a pair of secondary circuits inductively related to said conductor and relatively movable with respect to each other and to the conductor.

4. A wave balance, comprising a conductor having substantially uniformly distributed inductance, resistance and capacity, a shield of conducting material surrounding said conductor for reducing the electrostatic coupling between the conductor and adjacent conductors, and secondary circuits inductively related to said conductor and relatively movable with respect to each other and to the conductor.

5. A wave conductor, comprising an insulating support, a layer of laminated conducting material surrounding said support, a dielectric surrounding said conducting layer, a conducting wire wound on said dielectric, a dielectric surrounding said conductor, a second layer of laminated conducting material surrounding the last mentioned dielectric, and a pair of secondary circuits inductively associated with said conductor and relatively movable with respect to each other and to the conductor.

6. A wave balance comprising a conductor having substantially uniformly distributed inductance, resistance and capacity, secondary circuits inductively related to said conductor and relatively movable with respect to each other and to the conductor, and a non-inductive potentiometer, the resistance of which is large in comparison with the impedance of the secondary circuit, connected across one or both of said circuits.

7. A wave balance, comprising a conductor having substantially uniformly distributed inductance, resistance and capacity, secondary circuits inductively related to said conductor and relatively movable with respect to each other and to the conductor, a non-inductive potentiometer, the resistance of which is large in comparison with the impedance of the secondary circuit connected across one or both of said circuits, a system of conductors electrically associated with said circuits, and means for balancing in phase and in amplitude by the electromotive force induced in one of said circuits a second electromotive force impressed upon a definite point of said system.

8. A wave balance, comprising a conductor having substantially uniformly distributed inductance, resistance and capacity, and a pair of secondary circuits inductively associated with said conductor and arranged to be relatively positioned with respect thereto so that the relative amplitudes and time phase relation of the electromotive forces of a predetermined frequency induced therein can be varied.

9. A wave balance, comprising a conductor having substantially uniformly distributed inductance, resistance and capacity, a pair of secondary circuits inductively associated with said conductor and arranged to be relatively positioned with respect thereto so that the relative amplitudes and time phase relation of the electromotive forces of a predetermined frequency induced therein can be varied, a system of conductors electrically associated with said circuits, and means for balancing in phase and in amplitudes by the electromotive force induced in one of said circuits a second electromotive force impressed upon a definite point of said system.

10. A wave balance, comprising a conductor having substantially uniformly distributed inductance, resistance and capacity, and possessing a sufficiently high resistance and capacity to make it a true wave conductor and to render it practically aperiodic, and secondary circuits inductively related to said conductor and relatively movable with respect to each other and to the conductor.

11. A wave balance, comprising a conductor having substantially uniformly distributed inductance, resistance and capacity, secondary circuits inductively related to said conductor and relatively movable with respect to each other and to the conductor, a non-inductive potentiometer the resistance of which is large in comparison with the impedance of the secondary circuit connected across one or both of said circuits, and means for balancing both in phase and in amplitude a harmonic electromotive force impressed upon a definite point of a system of conductors against that generated at some other point of the system by the action of the impressed electromotive force.

12. A wave balance, comprising a conductor having substantially uniformly distributed inductance, resistance and capacity, a pair of secondary circuits inductively related to said conductor and relatively movable with respect to each other and to the conductor, a system of conductors including a vacuum tube amplifier associated with said circuits, means including one of said circuits for producing a pulsating electromotive force on the plate of said amplifier, and means for balancing in phase and amplitude by the electromotive force of the other circuit the pulsating electromotive force produced on said plate.

13. A wave balance, comprising a conductor having substantially uniformly distributed inductance, resistance and capacity, and secondary circuits adapted to be electrically associated with said conductor and to be adjustable with respect to each other and with the said conductor.

14. A wave balance, comprising a conductor having substantially uniformly distributed inductance, resistance and capacity, and possessing a sufficiently high resistance and capacity to make it a true wave conductor and to render it practically aperiodic, and secondary circuits adapted to be electrically associated with said conductor and to be adjustable with respect to each other and with the said conductor.

In testimony whereof I affix my signature.

MICHAEL IDVORSKY PUPIN.